Jan. 24, 1961
C. J. WAYNE ET AL
2,968,920
ENGINE MOUNTING ARRANGEMENT
Filed Jan. 28, 1959
2 Sheets-Sheet 1
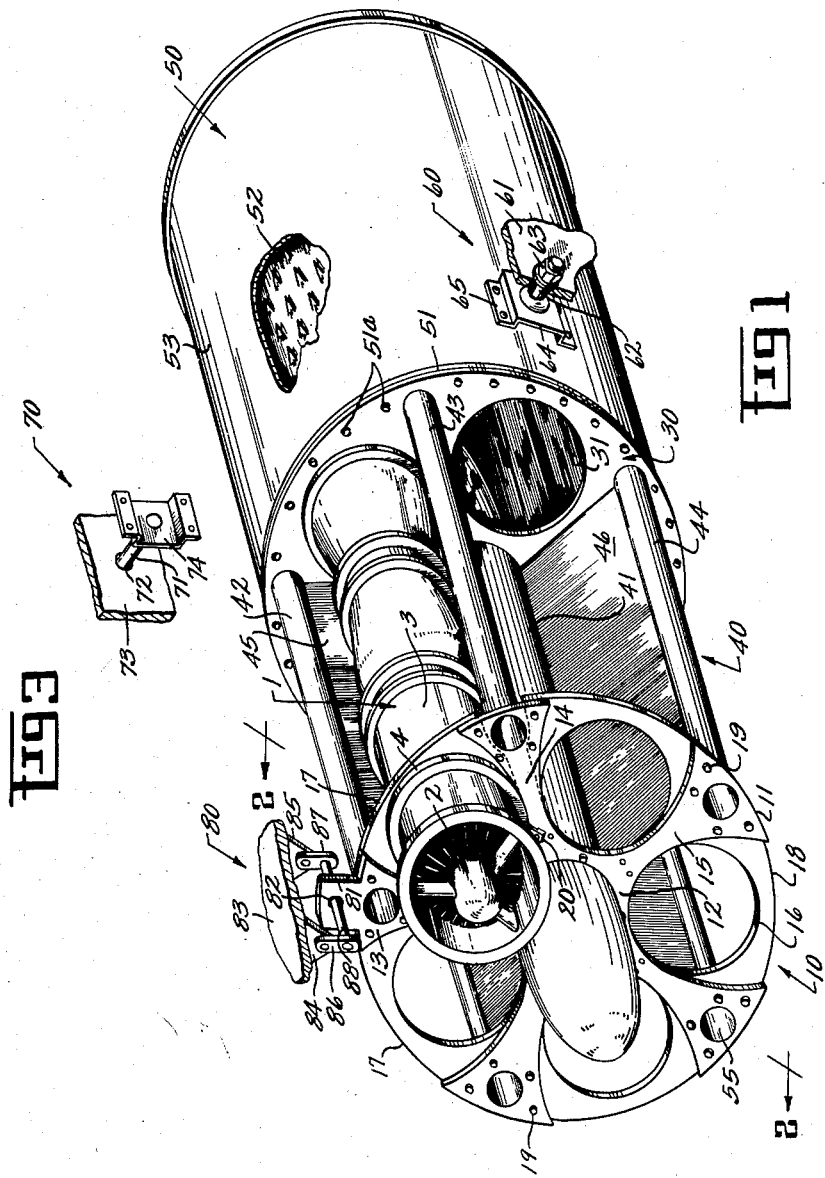
INVENTORS
DENIS P. EDKINS
RAYMOND L. CLEVELAND
BY CHARLES J. WAYNE
William L. Ericson
ATTORNEY

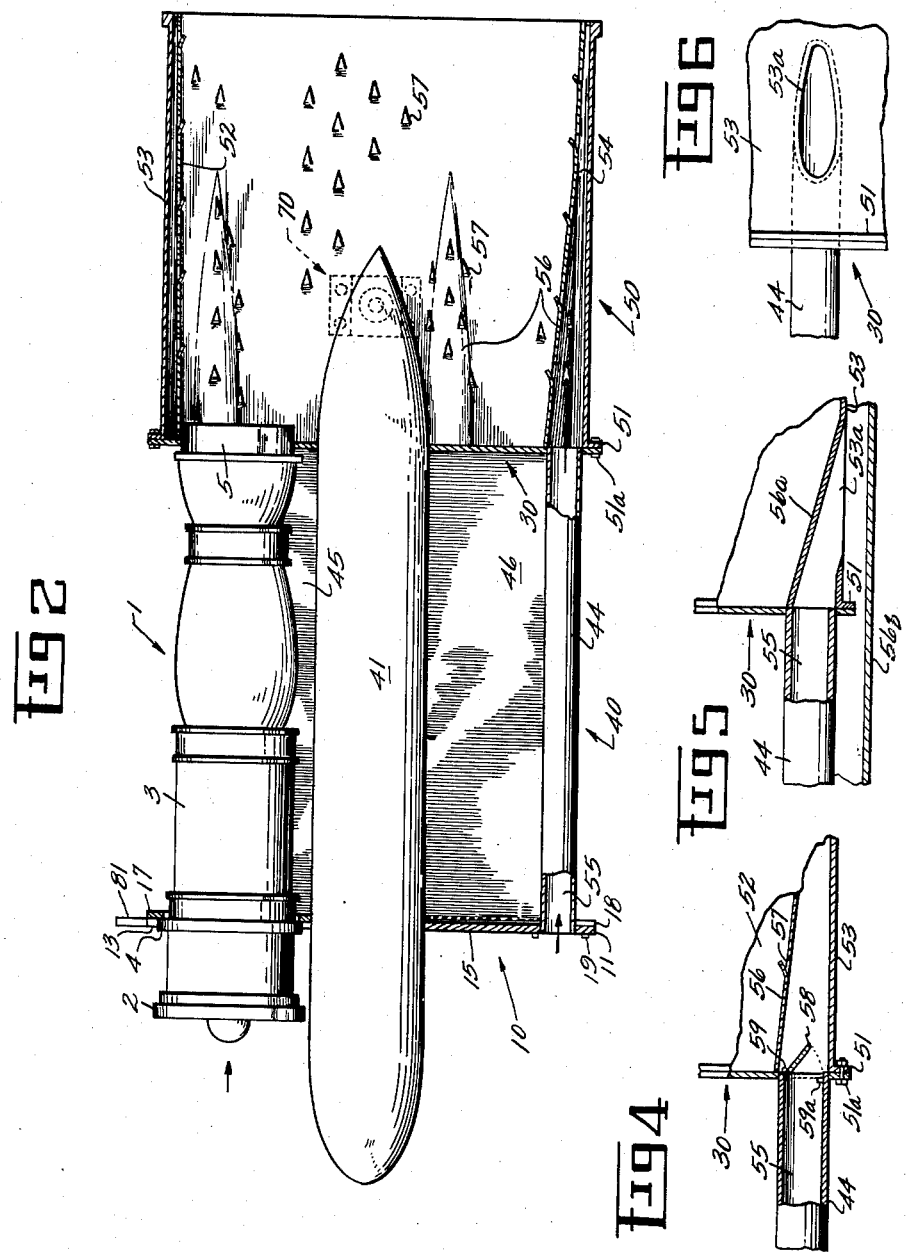

United States Patent Office 2,968,920
Patented Jan. 24, 1961

2,968,920

ENGINE MOUNTING ARRANGEMENT

Charles Joseph Wayne, Beverly, and Denis Pierpoint Edkins and Raymond Linly Cleveland, Lynnfield, Mass., assignors to General Electric Company, a corporation of New York Filed Jan. 28, 1959, Ser. No. 789,556

13 Claims. (Cl. 60—35.6)

Our invention relates to engine mounting arrangements and more particularly to engine mounting arrangements wherein a plurality of small aircraft engines are positioned, for example in a cluster, upon a mounting structure to form a single larger engine which may be supported by the aircraft as a single unit.

In modern times, the pressing and continuous need for higher speed aircraft has been responsible for many rapid advances in aircraft power plant technology. Amongst the many advances made in the search for more efficient engines having higher thrust to weight ratios has been the determination that, beyond a certain value of thrust for a given engine, it becomes more advantageous and efficient to utilize a plurality of small engines in a cluster in place of a single larger engine to obtain a thrust equal in value to that of the single larger engine. The advantage of a cluster arrangement of small engines over a single larger engine is primarily realized by an appreciable saving in total weight for a given value of thrust required. Alternatively, the use of a cluster of small engines as a substitute for a single larger engine would provide an increase in thrust should the weights of the two units be maintained constant.

The use of a cluster of small engines in the present state of the prior art presents for satisfactory solution a twofold problem with respect to the mounting of a number of small engines to an aircraft frame as a unit. Due to the fact that the engines would normally be brought up to speed individually, the engines must be mounted in a manner to provide for differential thermal expansion relative to each other. Additionally, since all of the engines will thermally expand in operation, the mounting arrangement must compensate for differential expansion between the engines and the aircraft frame.

One form of solution to this problem in accordance with our invention incorporates the use of a mounting structure to which each engine is individually mounted for thermal expansion. The mounting structure in turn may then be independently mounted as a unit to the aircraft frame in a manner to provide for thermal compensation between the mounting structure and the aircraft frame. This arrangement facilitates the removal of the engine cluster for repairs or replacement of the small engines and, additionally, allows the small engines to be used in conjunction with a common afterburner to provide a simple means for obtaining greatly increased thrust when required.

Accordingly, one object of our invention is to provide a rigid multiple engine mounting structure which is suitable for attaching to the airframe of an aircraft and which is constructed and arranged to compensate for differential thermal expansion of the individual engines of a group and for the differential thermal expansion of the engines with respect to the aircraft frame.

A further object of our invention is to provide a multiple engine mounting arrangement having means for compensating for the thermal expansion of the engines and providing a common afterburner section for the engines.

An additional object of our invention is to provide means for conducting a cooling fluid to a common afterburner through a thermally compensating mounting structure for a plurality of small engines.

Further objects and advantages of our invention will become apparent as the following description proceeds.

Briefly stated, in accordance with one embodiment of our invention, we provide a mounting structure having a plurality of mounting members positioned in predetermined positions thereon for securing the mounting structure to an aircraft in a manner to afford differential thermal expansion of the mounting structure relative to the aircraft. The mounting structure also includes spaced support members and means for mounting a plurality of engines upon the support members in such a manner that each engine is rigidly secured near one end by one of the support members and slidably supported at its other end by the remaining one of the support members to afford differential thermal expansion of each engine relative to the mounting structure. Additionally, a common afterburner is connected to one of the support members so that the exhausts of each of the engines may discharge into the common afterburner and, further, passage-forming means are provided for conducting a cooling fluid from the inlet area of the engines to the common afterburner in order to provide cooling and diluent air for the afterburner.

While the specification concludes with claims particularly pointing out and distinctly claiming the subject matter which we regard as our invention, it is believed that the invention will be better understood from the following description taken in conjunction with the accompanying drawings in which:

Fig. 1 is a perspective view, partly in section, of a mounting structure embodying our invention.

Fig. 2 is a side view, partly in section, taken along the plane 2—2 indicated in Fig. 1.

Fig. 3 is a perspective view of a mounting pad used in supporting the mounting structure to the aircraft frame.

Fig. 4 is a side view, partly in section, of a portion of the structure shown in Fig. 2 and illustrating a modification thereof.

Fig. 5 is a side view, similar to Fig. 4, showing a second modification of a portion of the structure shown in Fig. 2.

Fig. 6 is a plan view of the modification shown in Fig. 5.

Referring to Figs. 1 and 2, a mounting structure for supporting five small aircraft engines in a cluster has been illustrated. In this arrangement only one engine, designated generally by the reference numeral 1, has been shown for simplicity and clarity. However, it will be understood that the following description relating to this engine applies equally to the remaining engines. The mounting structure includes first and second support plates or members shown generally at 10 and 30, respectively, a structural assembly shown generally at 40 for rigidly interconnecting the first and second support members, and a common afterburner section shown generally at 50 into which the exhaust of each engine discharges.

The engine 1 includes an inlet section 2 and a compressor section 3 (more clearly shown in Fig. 2) which are joined together at the flange 4. In the preferred embodiment of our invention, each engine is rigidly connected near its inlet end to the first support member 10 and is slidably supported at its exhaust section 5 by the second support member 30; however, it will be apparent to those skilled in the art that with minor modifications the sliding support may be formed at the inlet end and the rigid support may be formed at the exhaust end of the engine without departing from our invention in its broader aspects. Additionally, it is comprehended that one or more engines may have its sliding and rigid supports reversed from those of the remaining engines and still be within the spirit and scope of our invention.

In the embodiment of the invention as illustrated and with particular reference to Fig. 1, the engine 1 is removably fastened to the first support member 10. This support member includes an element 11 which is fixed in spaced relation to the second support member 30 and which is provided with a central hub portion 12 and a plurality of radially extending legs. Since the particular form of our invention herein illustrated contemplates the utilization of five engines, the fixed element 11 includes five radially extending legs, three of which are indicated at 13, 14 and 15. The radially extending legs are shaped so as to form one-half of a plurality of engine inlet duct receiving openings 16 between adjacent legs. The support member 10 further includes a plurality of removable elements, two of which are indicated by 17 and 18, that cooperate with the radially extending legs 13, 14 and 15 to form a second half of each of the engine inlet duct receiving openings 16. It is apparent from an inspection of the drawings that there is a corresponding removable element for each pair of radial legs and that the number of removable elements required is equal to the number of engines that are to be mounted in the mounting structure. Removable fastening means such as bolts 19 are used to join the removable elements 17 and 18 to the radially extending legs 13, 14 and 15 in a manner well known to the art.

Engine 1, as well as each of the other engines, by reason of the position and arrangement of its flange 4 is prevented from moving axially rearward by the removable element 17. Alternatively, flange 4 may abut upon fixed element 11 to restrain it against rearward axial movement. In order to constrain the engine from moving axially forward and, additionally, to assist in preventing the engine from rotating about its own axis, clamping dogs, one of which is shown at 20, are provided. It is obvious that various other means can be used in place of clamping dog 20 to constrain the engine with respect to both forward axial movement and rotation. Such means might take the form, for example, of a series of additional arcuate plates bolted on the upstream side of fixed element 11 and having key or dowel means engageable with the flange 4 to prevent rotation of the engine.

The first support member 10, when completely assembled with the requisite number of engines in place, serves a dual function. In addition to supporting the inlet end of each engine, it also serves to provide a firewall which isolates the forward cool parts of each engine from the parts located in the main combustor zone.

The second support member 30 contains a plurality of engine exhaust duct receiving openings 31 which are formed in alignment with the engine receiving openings 16 of the first support member 10. Each of the engine exhaust duct receiving openings 31 is of such diameter as to slidingly receive the exhaust section 5 of the engine 1. The second support member 30, in addition to serving as a rear support for the engines, also isolates the hot exhaust portion of the engines from the upstream portions of the engines and therefore also serves as a firewall.

The structural assembly, shown generally at 40, is positioned between the first support member 10 and the second support member 30. It serves to rigidly interconnect the two support members and maintain them in axially aligned, spaced apart relation. The structural assembly comprises a large central tubular member 41 which is rigidly connected to both the first and second support members, 10 and 30 respectively, by means of welding or in any other suitable manner. The central tubular member, being hollow, may serve an additional function as an enclosure for common engine auxiliaries and, therefore, may include access plates (not shown) for this purpose. Further, the central tubular member acts as a heat shield between the various engines and their auxiliaries located within the tubular member. A plurality of circumferentially spaced, peripherally disposed, passage-forming elements, three of which are shown at 42, 43 and 44, are rigidly connected to both the first support member 10 and the second support member 30. In the preferred embodiment, wherein a cluster mounting structure for five small engines is contemplated, there will be five of these small tubular elements. The tubular elements are preferably welded at either end to the support members in alignment with openings formed in each support member; however, they may be secured by means of flanges bolted to the support members or they may be provided with threaded ends which screw into threaded holes provided in the support members. In order to add structural strength to the structural assembly and additionally, to divide the mounting structure into a plurality of spaced compartments, radial webs, two of which are indicated at 45 and 46, are rigidly connected between each of the circumferentially spaced peripherally disposed small tubular elements and the central tubular element 41. The radial webs may be welded or otherwise fastened to the support members 10 and 30, respectively, in order to provide a rigid mounting structure.

A common afterburner section, shown generally at 50, in Fig. 1 and in greater detail in Fig. 2, is disposed downstream of the second support member 30 and is rigidly interconnected with the second support member or firewall by means of the flange and connecting bolts shown at 51 and 51a, respectively. The afterburner section 50 comprises inner and outer spaced walls 52 and 53, respectively, which form an annular cooling fluid chamber 54 disposed about the periphery of the common afterburner section 50. Each of the circumferentially spaced, peripherally disposed, small tubular passage-forming elements 42, 43, 44 etc. on the structural assembly 40 provide passages, one of which is shown at 55, leading from the forward end of the mounting structure into the cooling fluid chamber 54. Bullet-shaped diffusing areas 56 are formed on the inner wall 52 to provide for distribution of the cooling fluid from passages 55 into the cooling fluid chamber 54 surrounding the afterburner. Additionally, a plurality of passageways 57 are formed in the inner wall 52 of the afterburner section to provide for the flow of cooling fluid from the cooling fluid chamber 54 to the interior of the afterburner. The passageways 57 are disposed about substantially the entire surface of the inner wall 52 in order to keep that wall free from the hot gases developed both in the engines and in the afterburner. Separate nozzle means (not shown) may be provided in the afterburner section in order to allow for the injection of fuel into the common afterburner section.

Under certain conditions of flight, during which the relative pressures at either end of passage 55 are such that no flow of cooling fluid into the afterburner occurs, it may be necessary to provide means to prevent a reverse flow through the passages. The modification shown in Fig. 4 may be utilized for this purpose. In this modification, we provide a check valve 58 pivotably mounted at one end of passage 55 by means of a hinge 59. Should the pressure in the afterburner exceed the pressure at the inlet of the passage, the pressure differential will cause the check valve 58 to swing to its closed position, as defined by its abutment against stop 59, and prevent a reverse flow of hot gases through the passage 55.

An additional modification which may be used in conjunction with our mounting structure has been illustrated in Figs. 5 and 6. In this modification we provide additional passage-forming means in communication with passages 55 to convey cooling fluid to the exterior of the afterburner in order to cool the area between the afterburner outer wall 53 and the surrounding aircraft frame 56b. As shown in the illustrations, the bullet-shaped diffusing area 56 has been replaced by a conduit 56a which leads to the outer wall 53 of the afterburner and terminates in an elliptical opening 53a formed in the outer wall. It will be apparent to those skilled in the art that this modification may be used simultaneously on a mounting structure with the preferred embodiment previously described by utilizing some of the tubular elements 42, 43, 44 to provide cooling air to the afterburner interior and others to provide cooling air to the space between the afterburner and the aircraft frame.

Referring again more particularly to Fig. 1, engine mounting members or pads, shown generally at 60, 70 and 80, serve to support the mounting structure as a unit within the aircraft frame. Mounting pads 60 and 70 are attached to either side of the afterburner 50 and serve to take fore, aft and vertical loads on the mounting structure. Mounting pad 60 is fixed to a portion 61 of the aircraft frame by means of a threaded pin 62 and nut 63. The pin 62 is rigidly supported from a bracket 64 which in turn is rigidly mounted on afterburner 50 by means of bolts 65. The pin 62 may be welded or otherwise connected to the bracket 64 in order to provide a rigid connection between the two members. Mounting pad 60 serves to take lateral loads on the mounting structure in addition to fore, aft and vertical loads.

As shown more clearly in Fig. 3, mounting pad 70, which is fastened to the opposite side of afterburner 50 from mounting pad 60, comprises a pin 71 which slidingly engages a slot 72 formed in a portion 73 of the aircraft frame. The pin 71 is rigidly supported by a bracket 74 which in turn is rigidly mounted on afterburner 50 in a manner similar to that utilized in mounting pad 60. Mounting pad 70 takes fore, aft and vertical loads on the mounting structure; however it is free to move laterally by the sliding engagement of pin 71 with slot 72 in order to compensate for radial thermal expansion of both the mounting structure and the afterburner.

Mounting pad 80, as more clearly shown in Fig. 1, comprises an extension plate 81 formed on radially extending leg 13. The plate 81 has an aperture 82 formed therein. In order to compensate for longitudinal thermal expansion of the mounting structure and to support the forward end of the mounting structure from a portion 83 of the aircraft frame, depending lugs 84 and 85 are formed on the aircraft frame and swinging links 86 and 87 are each pivotally supported on one of the lugs. A longitudinally disposed support bar 88 is positioned between the swinging links 86 and 87 and extends through the aperture 82 formed in the plate 81. The support bar 88 and plate 81 are in sliding engagement with each other to facilitate relative movement of the plate with respect to the bar when the mounting structure expands.

Thus it may be seen that the individual engines are held to a common datum plane at the first support member 10 and expand rearwardly therefrom. Additionally, the mounting structure is held to a datum plane at the mounting pads 60 and 70 and it expands forwardly and rearwardly therefrom. Mounting pad 80 allows relative longitudinal movement between the mounting structure and aircraft frame and takes loads only in the plane of the first support member 10.

It is obvious that we have provided a convenient means of mounting a plurality of engines in a mounting structure which permits any one, or all of the engines to expand thermally without restraint but at the same time sustains the structural, inertial and gyroscopic loads of the engines and transmits these loads to the airframe. The overall thermal expansion of the mounting structure unit also is provided for in a preferred manner. Additionally, a weight reduction and simplification is achieved by the use of many parts of the structure for more than one purpose. For example, the peripheral tubes indicated at 42, 43 and 44, are used for both structural purposes and as air ducts; central tubular member 41 may be used as a structural member, a heat shield and additionally, as an auxiliary equipment mount since the tube may have auxiliary equipment mounted internally thereof; the first support member 10 serves as a mounting pad to support the mounting structure from the aircraft frame, as a support for the forward end of each engine, and additionally, as a firewall separating the cool engine inlet area from the hot main combustor zone; the second support member 30 may be utilized as a rear engine mount, an afterburner support, and additionally provides the assembly with a firewall to prevent communication between the afterburner chamber and the individual engine compartments; likewise, the radial web members indicated at 45 and 46, serve as structural members and, additionally, as compartment separators isolating each engine from its neighbors.

While we have shown and described a particular embodiment of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. A multiple engine mounting structure for use in an aircraft comprising first and second support members, structural means rigidly interconnecting said members in spaced relationship to each other, mounting members positioned adjacent to each of said support members for securing the mounting structure to the aircraft, said mounting members being constructed and arranged to permit relative movement between the aircraft and the mounting structure laterally and longitudinally, thereby to afford differential thermal expansion of the mounting structure relative to the aircraft, and means for mounting a plurality of engines upon said support members, the respective engines being rigidly secured by said mounting means to one of said support members and slidably supported by the remaining one of said support members to afford differential thermal expansion of each engine relative to the mounting structure.

2. The combination of claim 1 wherein said support members are disc-shaped and said structural means comprises a central tubular member positioned between and coaxial with said support members, a plurality of peripherally disposed tubular members circumferentially spaced about and rigidly interconnecting said support members, and a plurality of radially disposed web members interconnecting said peripheral tubular members with said central tubular member.

3. The combination of claim 2 wherein said first disc-shaped support member comprises a plurality of circumferentially arranged removable elements, each of said elements having an inwardly facing arcuate opening for receiving a portion of a corresponding engine, and a fixed element including a plurality of radially extending legs forming a plurality of arcuate openings, each of said last-named openings being arranged to mate with a corresponding one of said first-named arcuate openings for receiving another portion of a corresponding engine, means rigidly uniting said plurality of elements with said fixed element, and means engaging said first support member for connecting said support member to said engines.

4. The combination of claim 3 wherein said second disc-shaped support member is formed to include a plurality of engine openings disposed about the central tubular member, said second support member slidably supporting said engines with respect to the mounting structure.

5. The combination of claim 1 wherein the second support member constitutes the engine exhaust support member and further including a common afterburner section rigidly secured to and positioned axially adjacent said second support member, said afterburner section comprising inner and outer spaced walls defining a cooling fluid area about the periphery of said afterburner section; means formed in said inner walls for conducting a cooling fluid from said cooling fluid area to the interior of said afterburner section; and passage-forming means formed integrally with at least a portion of said structural means for conducting a cooling fluid through the mounting structure and into said cooling fluid area.

6. The combination of claim 5 further including valve means cooperable with said passage-forming means for preventing a reverse flow through said passage-forming means.

7. The combination of claim 1 wherein the second support member constitutes the engine exhaust support member and further including a common afterburner section rigidly secured to and positioned axially adjacent said second support member, said afterburner section having a peripherally disposed outer wall, an aircraft frame circumferentially spaced about said outer wall and forming therebetween a cooling fluid area about the afterburner section; and passage-forming means formed integrally with at least a portion of said structural means for conducting a cooling fluid through the mounting structure and into said cooling fluid area.

8. A multiple engine mounting structure for use in an aircraft comprising first and second support members, structural means rigidly interconnecting said members in spaced relationship to each other, a first mounting member positoned adjacent said first support member, second and third mounting members positoned adjacent said second support member, at least two of said mounting members being constructed and arranged to permit relative movement between said aircraft and the mounting structure lateraly and longitudinally, respectively, thereby to afford differential thermal expansion of the mounting structure relative to the aircraft, and means for mounting a plurality of engines upon said support members, the respective engines being rigidly secured by said mounting means to one of said support members and slidably supported by the remaining one of said support members to afford differential thermal expansion of each engine relative to the mounting structure.

9. An aircraft multiple engine mounting arrangement comprising first and second support members, structural means rigidly interconnecting said members in spaced relationship to each other, means for mounting a plurality of engines upon said support members, the respective engines being rigidly secured by said mounting means to one of said support members and slidably supported by the remaining one of said support members, each of said engines being mounted with its inlet end disposed forwardly of said first support member and its exhaust end disposed rearwardly of said second support member, a common afterburner section rigidly secured to and positioned axially rearward of said second support member, and passage-forming means formed integrally with at least a portion of said structural means for conducting a cooling fluid from the inlet side of the engines to the interior of the afterburner section.

10. An aircraft multiple engine mounting arrangement comprising first and second disc-shaped engine support members having circumferentially spaced and peripherally disposed apertures formed therein, a plurality of tubular members rigidly interconnecting said support members in spaced relationship to each other, said tubular members being in alignment with the apertures formed in said support members to form a plurality of passages between said support members, a common afterburner section rigidly secured to and positioned axially adjacent of said second support member, said afterburner section comprising inner and outer spaced walls defining a peripherally disposed cooling fluid chamber, and means formed in said inner wall and in communication with said passages through said cooling fluid chamber for conducting a cooling fluid into the interior of said afterburner section.

11. An aircraft multiple engine mounting arrangement comprising a first disc-shaped member including a plurality of circumferentially arranged removable elements, each of said elements having an inwardly facing arcuate opening, a fixed element having a plurality of radially extending legs forming a plurality of circumferentially spaced peripherally disposed arcuate openings, each of said openings being arranged to mate with a corresponding one of said first-named arcuate openings to form a plurality of engine receiving openings in said first support member, means rigidly uniting said plurality of removable elements with said fixed element, and means engaging said first support member for rigidly connecting the engines to said support member; a second disc-shaped support member formed to include therein a plurality of circumferentially spaced peripherally disposed engine openings, said second support member slidably supporting the engines within said engine openings; a central tubular member coaxially and rigidly interconnecting said first and second support members in such a manner that corresponding engine openings of each support member are in axial alignment, a plurality of peripherally disposed tubular members circumferentially spaced about and rigidly interconnecting said support members, and a plurality of radially disposed web members, each of said web members rigidly interconnecting a corresponding one of said peripheral tubular members with said central tubular member and said first and second support members to form a plurality of isolated engine compartments about the periphery of the mounting arrangement; a common afterburner section rigidly connected to said second support member for receiving the exhaust of each engine, said afterburner section comprising inner and outer spaced walls defining a peripherally disposed cooling chamber; and passage-forming means including said peripherally disposed tubular members, cooling chamber and passageways formed in said afterburner inner walls for conducting a cooling fluid to the interior of the afterburner section.

12. The combination of claim 11 further including a check valve positioned in each of said tubular members for preventing a reverse flow through the passage-forming means.

13. A mounting arrangement for mounting a cluster of engines to an aircraft frame, said cluster of engines including an inlet end support member, an exhaust end support member, and a common afterburner, said mounting arrangement comprising: first and second mounting pads oppositely disposed on said afterburner, each of said mounting pads having a pin rigidly positioned thereon, said first mounting pad pin being rigidly fixed to said aircraft frame; means formed on said aircraft frame for slidably supporting said second mounting pad pin for movement only in a radial direction from said afterburner; a third mounting pad secured to said inlet support member; and means for securing said third mounting pad to said aircraft frame, said means comprising first and second spaced links pivotally mounted on said frame, and a longitudinally disposed rod positioned between said links and in engagement with said third mounting pad whereby said third mounting pad is longitudinally slidable and transversely movable with respect to said aircraft frame.

References Cited in the file of this patent

UNITED STATES PATENTS

| | | |
|---|---|---|
| 2,481,547 | Walker et al. | Sept. 13, 1949 |
| 2,516,671 | Bowers et al. | July 25, 1950 |
| 2,580,207 | Whittle | Dec. 25, 1951 |
| 2,714,999 | Thieblot et al. | Aug. 9, 1955 |
| 2,828,607 | Johnson | Apr. 1, 1958 |